(12) United States Patent
Embacher

(10) Patent No.: US 9,501,605 B1
(45) Date of Patent: Nov. 22, 2016

(54) AUTO-CONSTRAINT CHIP-LEVEL ROUTING

(71) Applicant: Dialog Semiconductor (UK) Limited, Reading (GB)

(72) Inventor: Wolfgang Embacher, Munich (DE)

(73) Assignee: Dialog Semiconductor (UK) Limited, Reading (GB)

( * ) Notice: Subject to any disclaimer, the term of this patent is extended or adjusted under 35 U.S.C. 154(b) by 0 days.

(21) Appl. No.: 14/745,768

(22) Filed: Jun. 22, 2015

(51) Int. Cl.
*G06F 17/50* (2006.01)

(52) U.S. Cl.
CPC .................. *G06F 17/5077* (2013.01)

(58) Field of Classification Search
CPC ........... G06F 17/5022; G06F 17/5027; G06F 17/5077; G06F 17/5031; G06F 17/5072; G06F 2217/84; G06F 17/5068; G06F 2217/86; G06F 13/22; G06F 13/4291; G06F 15/7864; G06F 17/50; H05K 3/0005; H05K 1/0269; H05K 1/183; H05K 3/225; H05K 1/141
USPC .................................................. 716/126–131
See application file for complete search history.

(56) References Cited

U.S. PATENT DOCUMENTS

| 2008/0077898 A1* | 3/2008 | Subasic | G06F 17/5072 716/122 |
| 2009/0158232 A1* | 6/2009 | Ronkka | H01L 24/24 716/129 |
| 2012/0110541 A1* | 5/2012 | Ge | G06F 17/5031 716/134 |

* cited by examiner

*Primary Examiner* — Binh Tat
(74) *Attorney, Agent, or Firm* — Saile Ackerman LLC; Stephen B. Ackerman

(57) ABSTRACT

This application relates to a method of routing circuit paths of an integrated circuit, IC. The IC comprises a plurality of circuit elements and a plurality of circuit paths connecting the circuit elements. The method comprises steps of: receiving a representation of the IC, comparing, based on the representation, the circuit elements of the IC against a set of reference circuit elements, classifying the circuit paths of the IC into a plurality of categories based on a result of the comparison, and routing the circuit paths of the IC in accordance with their respective categories. The application further relates to a computer-readable storage medium comprising a computer program that makes a computer perform the steps of said method when executed and to an apparatus for routing circuit paths of an IC.

27 Claims, 4 Drawing Sheets

AUTO-CONSTRAINT CHIP-LEVEL ROUTING

TECHNICAL FIELD

This application relates to methods of routing circuit paths of integrated circuits (ICs). The application particularly relates to methods of routing circuit paths of ICs that minimize the impact of cross-talk between neighboring circuit paths.

BACKGROUND

Chip-level routing (top-level routing) of mixed-signal ICs requires so called routing constraints for different types of signals propagating along respective circuit paths. Requirements of chip-level routing are prevention of mutual interference (e.g. by controlling capacitive coupling), prevention of resistive voltage drop (e.g. by controlling a routing resistance) and reduction of electro-migration (e.g. by controlling a routing width).

SUMMARY

There is a need for an improved method of routing circuit paths of an IC. In view of this need, the present document proposes a method of routing circuit paths of an IC and a computer-readable storage medium comprising a computer program having the features of the respective independent claims.

According to aspects of the present disclosure, the circuit paths (or equivalently, the signals propagating along respective circuit paths) are grouped into routing classes. For every routing class, a set of routing constraints is defined which needs to be followed when actually routing the signals in layout. Correctly classifying the signals and choosing an appropriate set of routing constraints ensures that cross-talk (i.e. interference or noise coupling) between signals, that could otherwise impair operation of the IC, is avoided.

An aspect of the disclosure relates to a method of routing circuit paths of an integrated circuit, IC. The routing may relate to chip-level (top-level) routing. The IC may be a mixed-signal IC. The IC may comprise a plurality of circuit elements (circuit topologies) and a plurality of circuit paths (signal lines) connecting the circuit elements. The method may relate to designing a relative arrangement of circuit paths (signal lines) and/or circuit elements of the IC, i.e. to designing a layout of the IC. The method may comprise a step of receiving a representation of the IC. The representation of the IC may be a netlist or schematic database, for example. The method may further comprise a step of comparing, based on the representation, the circuit elements of the IC against a set of (known) reference circuit elements. This step may involve matching the circuit elements of the IC to respective ones of the set of reference circuit elements. The reference circuit elements may relate to known circuit elements. The method may further comprise a step of (automatically) classifying the circuit paths of the IC into a plurality of categories based on a result of the comparison. The categories may relate to routing categories (routing classes) and may be indicative of characteristics of a signal propagating along the respective circuit path. The method may yet further comprise a step of routing the circuit paths of the IC in accordance with their respective categories.

By automatically assigning the circuit paths to respective categories based on a result of the matching of the circuit elements to a set of reference circuit elements, the proposed method guarantees coupling- and cross-talk free top-level signal routing and achieves an optimized layout for signal integrity. By virtue of the automatic assignment of circuit paths to respective categories, the proposed method is scalable and therefore applicable also to routing of large-scale mixed-signal ICs, which can include up to several ten thousand circuit paths. The potentially disastrous impact of human error in the assignment of circuit paths to categories is avoided, and a circuit layout ensuring signal integrity and reliability can be obtained without resorting to simulation of the generated circuit layout, and without exploiting inheritance from previous projects or test chips. Problems relating to insufficient simulation coverage (which would result from the fact that mixed-signal ICs are time-continuous systems by nature and thus have an infinite number of possible state and transition combinations) therefore do not occur when employing the proposed method and a significant amount of time may be saved due to the absence of final tests of the generated classification. Summarizing, the proposed method is scalable, immune to human error, and time saving compared to conventional approaches.

In embodiments, the categories may be representative of characteristics of signals propagating along respective circuit paths with regard to mutual interference (cross-talk) between signals. Mutual interference, or cross-talk, may relate to noise coupling from one signal to another signal propagating along a circuit path routed within the coupling range of the circuit path of the one signal. Said characteristics with regard to mutual interference may relate to whether the signal emits noise (i.e. interferes with other signals), or whether the signal is sensitive to noise emitted by other signals (i.e. which is sensitive to interference). By assigning the signals (i.e. the circuit paths along which the signals propagate) to such categories, cross-talk between signals in the final layout of the mixed-signal IC can be effectively prevented.

In embodiments, the step of comparing the circuit elements of the IC against the set of reference circuit elements may involve identifying one or more circuit elements of the IC that correspond to respective reference circuit elements among the set of reference circuit elements. Accordingly, one or more of the circuit elements of the IC may be matched to respective reference circuit elements among the set of reference circuit elements. Thus, this step may be said to relate to a step of matching one or more of the circuit elements of the IC to respective reference circuit elements by comparing the circuit elements of the IC against the set of reference circuit elements.

In embodiments, the step of classifying the circuit paths of the IC into the plurality of categories may involve classifying circuit paths that connect to one or more of the identified circuit elements in accordance with known properties of the respective identified circuit elements. The known properties of the identified circuit elements may relate to known properties of the respective reference circuit element that matches (corresponds) to the identified circuit element. The known properties of the reference circuit elements may include input/output characteristics of respective reference circuit elements. For each reference circuit element, each signal input to or output from the respective reference circuit element (i.e. the boundary signals of the respective reference circuit element) may be associated with a given category. Thus, for each reference circuit element, categories of input and output signals may be stored, and respective circuit paths connecting to a circuit element of the IC that is identified to correspond to a given reference circuit elements may be classified in accordance with the stored categories for the given reference circuit element. In case of discrepancy between a category that would be assigned to a signal (circuit path) by virtue of being output from a first identified circuit element and another category that would be assigned to said signal (circuit path) by virtue of being input to a second identified circuit element, the signal (circuit path) may be assigned to a default category. The default category may be a safe category chosen in accordance with the two conflicting categories (e.g. the more conservative one of the conflicting categories). Thereby, reliable automatic assignment of circuit paths of the IC to routing categories requires merely assignment of boundary signals of a limited set of reference circuit elements to routing categories. Such assignment may be re-used for subsequent routing operations of different ICs, i.e. is independent from the ICs for which routing is performed.

In embodiments, the set of reference circuit elements may be stored in a database (library). For each reference circuit element, categories of its boundary signals may be stored.

In embodiments, the step of routing the circuit paths of the IC may involve routing the circuit paths of the IC in accordance with their respective categories and in accordance with a set of routing constraints for respective categories. Each category may have a unique set of routing constraints. Routing constraints may relate to prescribed minimum distances between circuit paths of given categories, to shielding that needs to be applied between circuit paths of given categories, to maximum/minimum length and/or width requirements, to maximum/minimum track impedance and/or capacitance to neighboring circuit paths/nets, and/or to a pre-selection of accepted routing layers, for example, or to other electrical or geometrical parameters.

In embodiments, any circuit paths of the IC that are not classified in the step of classifying may be classified into a default category. The default category may be a safe (default) category.

In embodiments, the plurality of categories may include a first category indicating that a signal propagating along the respective circuit path is a signal that influences signals propagating along circuit paths arranged within a coupling range of the respective circuit path. Such signal may be referred to as a noisy signal (aggressor). In the present disclosure, a noisy signal is understood to relate to a signal that is likely to have transients corresponding to rapid changes of signal level and thus to interfere with other signals.

In embodiments, the plurality of categories may include a second category indicating that a signal propagating along the respective circuit path is a signal that is sensitive to external influence. Such signal may be referred to a (noise) sensitive signal (victim), i.e. a signal that is sensitive to cross-talk. In the present disclosure, being sensitive to cross-talk is understood to indicate that integrity and reliability of the respective signal would be compromised by signal cross-talk above a given threshold.

In embodiments, the plurality of categories may include a third category indicating that a signal propagating along the respective circuit path is a signal that influences signals propagating along circuit paths arranged within a coupling range of the respective circuit path and that is sensitive to external influence. The third category may be the safe default category.

The routing constraints may include a prescribed minimum distance or a prescribed minimum level of shielding between circuit paths assigned to the first category and circuit paths assigned to the second or third categories. The routing constraints may further include a prescribed minimum distance or a prescribed minimum level of shielding between circuit paths assigned to the second category and circuit paths assigned to the third category. The routing constraints may further include a prescribed minimum distance or a prescribed minimum level of shielding between circuit paths assigned to the third category and other circuit paths assigned to the third category.

In embodiments, the plurality of categories may include a fourth category indicating that a signal propagating along the respective circuit path relates to a power supply for a respective circuit element. Routing constraints may include a maximum length and/or minimum width and/or maximum or minimum routing resistance of circuit paths assigned to the fourth category.

In embodiments, the method may further comprise a step of flagging circuit paths within a given category as circuit paths that may be routed alongside each other based on a result of said comparison. Alternatively, such circuit paths within a given category may be assigned to a sub-category of the given category. Circuit paths that may be routed alongside each other may be circuit paths the signals of which are known to be not present simultaneously. The given category may be the third category, for example. Thereby, the overall number of constraints that is to be satisfied in routing is reduced, which aids avoiding over-constrained layouts.

In embodiments, the IC may comprise a plurality of interconnected functional blocks formed by respective circuit elements of the IC.

Another aspect of the disclosure relates to a computer-readable storage medium comprising a computer program that makes a computer perform the steps of the method according to the aforementioned aspect.

Yet another aspect of the disclosure relates to an apparatus for routing circuit paths of an integrated circuit.

It will be appreciated that method steps and apparatus features may be interchanged in many ways. In particular, the details of the disclosed method can be implemented as an apparatus adapted to execute some or all or the steps of the method, as the skilled person will appreciate. In particular, this apparatus may comprise functional blocks implemented in software and/or hardware that are configured to perform respective steps of the method.

BRIEF DESCRIPTION OF THE DRAWINGS

Embodiments of the disclosure are explained below in an exemplary manner with reference to the accompanying drawings, wherein FIG. 1 schematically illustrates an example of an IC to which embodiments of the disclosure may be applied.

DESCRIPTION

Figure 1:
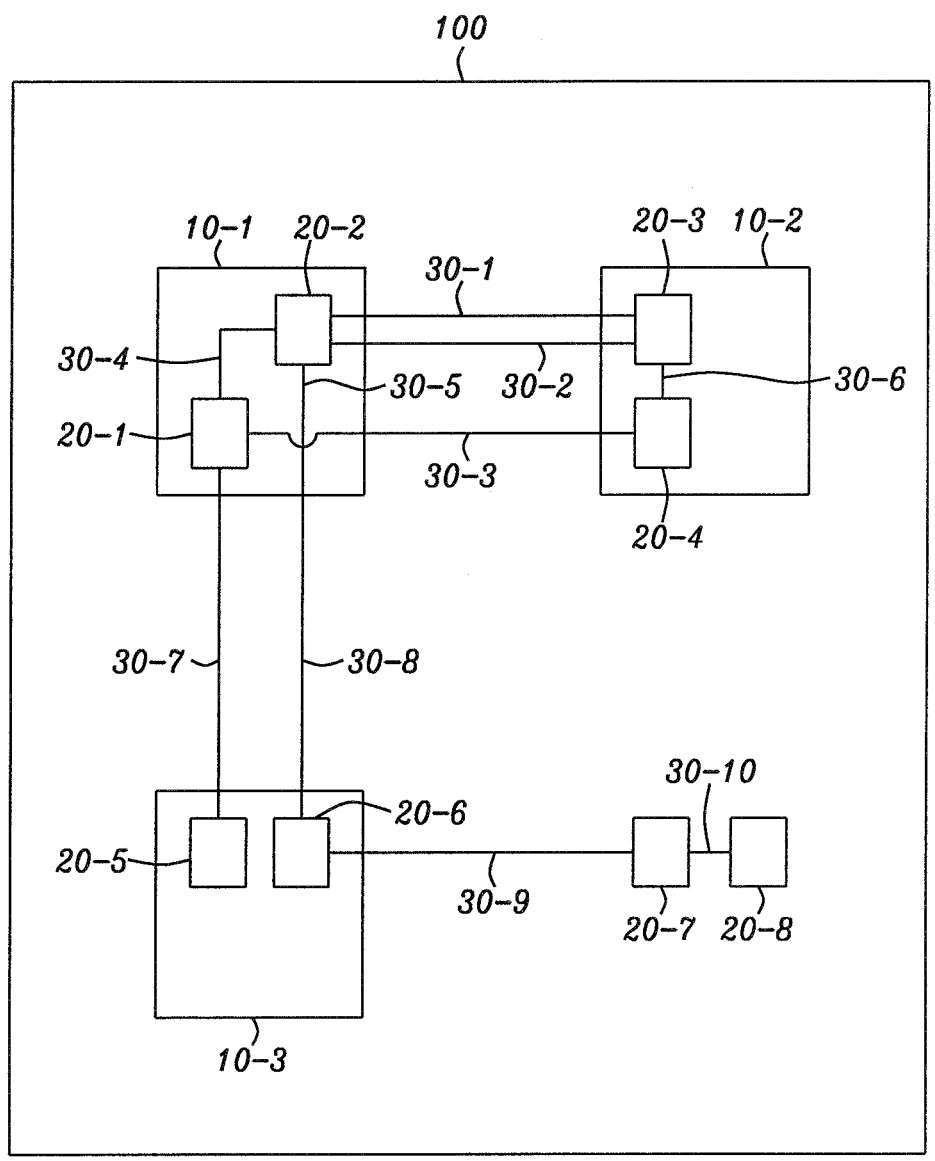

An example of an IC to which embodiments of the disclosure may be applied will be described with reference to FIG. 1. The IC 100 may be a mixed-level IC. The IC 100 may comprise a plurality of circuit elements (circuit topologies) 20-1, ..., 20-8. The circuit elements 20 may relate to individual devices, such as, for example, transistors, diodes, capacitors, etc., or to assemblies of such devices. A non-limiting and non-exhaustive set of examples for such circuit elements will be described below with reference to FIG. 3 through FIG. 5. The IC 100 may further comprise a plurality of functional blocks 10-1, 10-2, 10-3 that may be interconnected. The functional blocks 10 may be formed by respective circuit elements 20. Circuit paths (signal lines) 30-1, ..., 30-10 may connect the circuit elements 20, or correspondingly, the functional blocks 10. Signals may be input to or output from the IC 100 along respective circuit paths (not shown in the figure).

Figure 2:
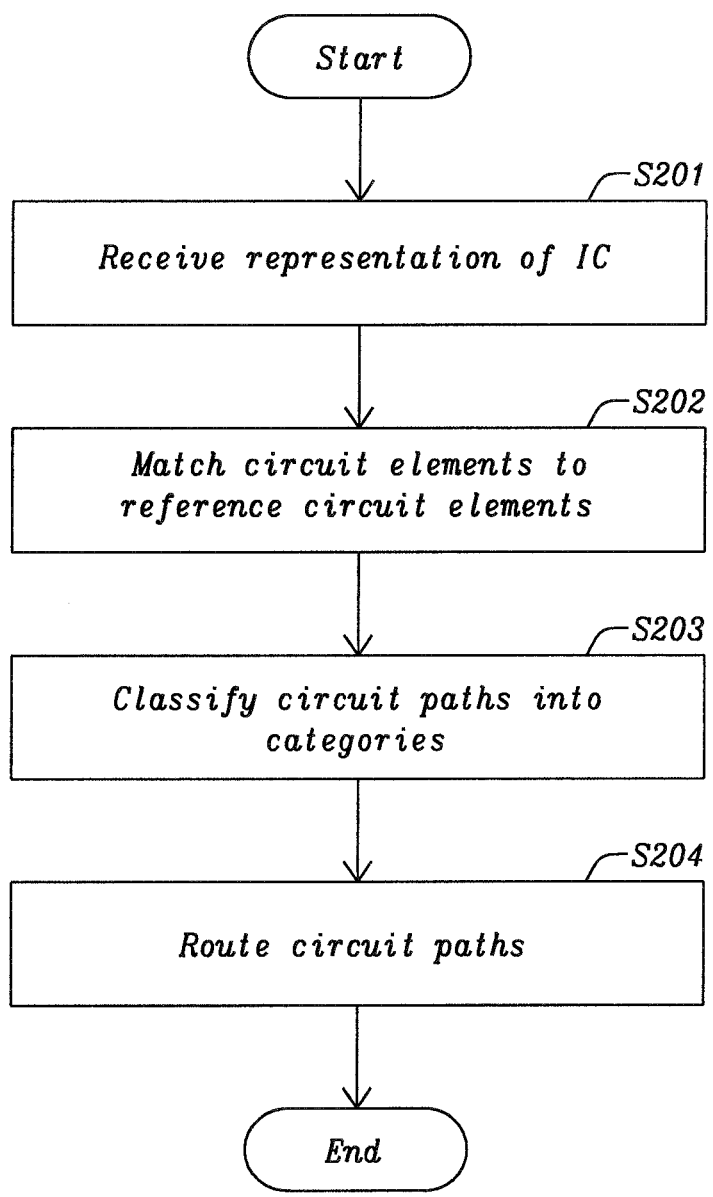
FIG. 2 is a flow chart schematically illustrating an example of a method according to embodiments of the disclosure, FIG. 3 schematically illustrates an example of a circuit element in the context of embodiments of the disclosure, FIG. 4 schematically illustrates another example of a circuit element in the context of embodiments of the disclosure, and FIG. 5 schematically illustrates yet another example of a circuit element in the context of embodiments of the disclosure.

Next, an example of a method according to embodiments of the disclosure will be described with reference to the flow chart of FIG. 2. This method may be referred to as a method of routing circuit paths of an IC, and more specifically, as a method of auto-constraint chip-level (top-level) routing. Broadly speaking, the method includes automatic classification of top-level signals by using structural circuit analysis at lower hierarchical levels of the design for large-scale mixed-signal ICs.

At step S201, a representation (circuit description) of the IC may be received. The representation of the IC may relate to a netlist or a schematic database, for example.

At step S202, the IC described by the representation received at step S201 may be analyzed by a suitable algorithm. This analysis may correspond to a structural circuit analysis aimed at recognizing known topologies and may involve a comparison of the circuit elements of the IC to a set of reference circuit elements (known circuit elements). In other words, the circuit elements of the IC may be compared against a set of known structures. The process of comparing the circuit elements of the IC against the set of known structures may involve identifying one or more circuit elements of the IC that correspond to (i.e. match with) respective reference circuit elements among the set of reference circuit elements.

The reference circuit elements may be provided in a database (library). The database may include, for each reference circuit element, a set of known properties (characteristics) of the respective reference circuit element. The set of known properties may include any or all of a structural topology description, devices type or size characteristics, or signal name patterns, for example. The database may further include a unique identifier for each reference circuit element. Further, the known properties of each reference circuit element may include input/output characteristics of the respective reference circuit element. That is, each reference circuit element may associate its boundary signals (signals that are input to or output from the reference circuit element) with a unique category (routing class). Said categories for the boundary signals may be stored together with the respective reference circuit element, e.g. in the database.

At step S203, the circuit paths of the IC may be (automatically) classified into (i.e. assigned to) a plurality of categories (routing categories, routing classes). Equivalently, it may be said that the signals propagating along respective circuit paths are classified into the categories. The classification may be performed based on a result of the analysis (comparison) at step S202. Each circuit path may be classified into exactly one of the categories. Each of the categories may have one or more sub-categories. The categories may be indicative of characteristics (properties) of signals propagating along respective circuit paths during operation of the IC. In particular, the categories may be representative (indicative) of characteristics with regard to mutual interference (cross-talk, noise coupling) of signals propagating along respective circuit paths.

Circuit paths may be classified into categories by the following procedure. First, circuit paths connecting to one or more circuit elements identified at step S202 (i.e. those circuit elements that match respective reference circuit elements) may be identified. Second, each of said identified circuit paths may be classified in accordance with the known input/output characteristics of the circuit element (or circuit elements) to which the respective circuit path connects. In case that a circuit path connects to more than one circuit element identified at step S202, and the categories that would be assigned to said circuit path by virtue of being an input signal to or output signal from the respective circuit elements do not coincide, the circuit path may be assigned to a (safe) default category, e.g. the third category described below, or to a most conservative category among the non-coinciding categories.

The signals may be grouped into categories e.g. by assigning property keywords to respective signals or by listing respective signals in separate text files, wherein one text file is provided for each category, and the text files and categories are provided in a one-to-one relationship.

A non-limiting and non-exhaustive list of categories that may be used in the context of methods according to embodiments of the disclosure is provided in the following. For example, said categories may include a (first) category ("NOISY") for circuit paths having signals with high frequency spectrum. Such signals may be referred to as aggressors. In other words, the first category may indicate that a signal propagating along a respective circuit path classified into the first category is a signal that influences (i.e. interferes with) signals propagating along circuit paths arranged within a coupling range of the respective circuit path.

Said categories may further include a (second) category ("SENSITIVE") for signals which require a high accuracy, i.e. which cannot tolerate cross-talk/interference above a given threshold. Such signals may be referred to as victims. In other words, the second category may indicate that that a signal propagating along a circuit path classified into the second category is a signal that is sensitive to external influence (cross-talk, interference) by other signals (aggressors).

Said categories may further include a (third) category ("NOISYSENSE") for circuit paths having signals with high frequency spectrum that at the same time require a high accuracy. Such signals are aggressors and victims at the same time. In other words, the third category may indicate that a signal propagating along a circuit path classified into the third category is a signal that influences (i.e. interferes with) signals propagating along circuit paths arranged within a coupling range of the respective circuit path and that is sensitive to external influence (cross-talk, interference) by other signals (aggressors).

The third category described above may include a sub-category of signals that are aggressors and victims at the same time, but that may nevertheless be routed alongside each other. This may be the case for signals that are not present simultaneously, for signals that are known to be stable when present simultaneously, or for signals that are known to be stable (e.g. not being switched or not emitting any noise) when the other signals are known to be sensitive to noise (e.g. being evaluated or actively used), and vice versa. In order to assign circuit paths into this sub-category of the third category, the input/output characteristics of the reference circuit elements may include an indication of time slots in which the boundary signals are known to be stable (e.g. zero) and/or an indication of time slots in which the boundary signals are known to be sensitive to noise. Apparently, as alternatives, also time slots in which the respective properties of the signals are known to be not satisfied could be indicated in the input/output characteristics. Assignment of circuit paths that are classified into the third category into the sub-category may be performed by flagging respective circuit paths as circuit paths that may be routed alongside each other. Said flagging may be performed based on a result of the analysis (comparison) at step S202.

Said categories may yet further include a (fourth) category ("SUPPLY") for circuit paths having signals, such as power supply signals for circuit elements or functional blocks of the IC. These signals may have certain requirements with regard to impedance, e.g. with regard to a maximum length and/or minimum width. In other words, the fourth category may indicate that that a signal propagating along a circuit path classified into the fourth category relates to a power supply for a respective circuit element or functional block.

Of the above categories, a category indicating that a signal propagating along a circuit path classified into the third category is a signal that influences (i.e. interferes with) signals propagating along circuit paths arranged within a coupling range of the respective circuit path and that is sensitive to external influence (cross-talk, interference) by other signals (aggressors), e.g. the third category, may be said to be the most conservative category. This most conservative category may serve as a safe default category.

Summarizing step S203, the routing classes may be associated to the chip-level signals based on the respective matched structures (circuit elements) to which respective circuit paths connect. Chip-level signals in this context are all signals inter-connecting matched structures. Any remaining unmatched signals (i.e. unconstrained signals) may be associated with a safe default routing class. This class must be used with the most conservative routing constraints to ensure signal integrity of all properly constraint signals. An example for such a safe default routing class is the third category mentioned above.

Thus, broadly speaking, step S203 may be said to relate to extraction of signal classification (circuit path classification, or net classification) based on a library of known topologies.

At step S204, the circuit paths of the IC may be routed (i.e. a layout for the IC may be determined) in accordance with their respective categories into which they have been classified at step S203. Routing may be performed further based on a set of routing constraints, e.g. routing constraints associated with each category. Routing may be achieved e.g. using auto-router software, such VCAR (Virtuoso Chip Assembly Router) by Cadence, for example.

These routing constraints may include spacing and/or shielding between circuit paths, maximum/minimum length and/or width requirements, maximum/minimum track impedance and/or capacitance to neighboring circuit paths, and/or a pre-selection of accepted routing layers, for example.

Broadly speaking, step S204 may be said to relate to propagation of block-level classification to top-level signals (circuit paths). A set of routing constraints may be associated with every signal class (routing class). In this context, the top-level layout resulting from step S204 ensures signal routing according to the extracted signal classes and the associated routing constraints.

Incidentally, it is a worst-case scenario of chip-level routing that a signal that is not classified as an aggressor, e.g. a signal that is classified as SENSITIVE, shows a high frequency spectrum under certain operating conditions, i.e. is in fact an aggressor. Due to the wrong classification e.g. as SENSITIVE, this signal could be routed with close coupling to a real sensitive signal, and would then degrade the chip performance under the certain operating condition. By performing automatic classification according to steps S202 and S203 described above, such scenarios can be reliably prevented.

A non-limiting and non-exhaustive set of examples for matching structures (e.g. reference circuit elements) will now be described with reference to FIG. 3 to FIG. 5.

Figure 3:
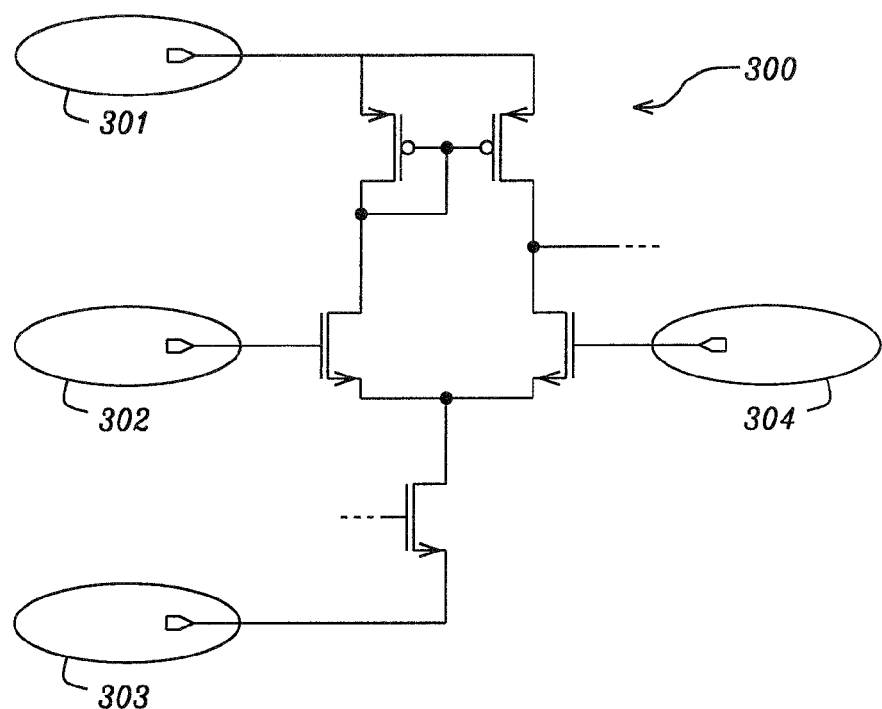

FIG. 3 schematically illustrates a differential pair 300 as an example of a circuit element in the context of embodiments of the disclosure. The differential pair comprises a number of interconnected transistors and has input/output signals 301, 302, 303, 304. Input signals 301, 303 may be classified as signals of category SUPPLY, whereas input signals 302, 304 connecting to control terminals (e.g. gate terminals) of respective transistors may be classified as SENSITIVE. Thus, whenever a structure corresponding to the differential pair 300 is identified in an IC at step S202, circuit paths connecting to the identified structure may be classified in accordance with the categories assigned to the input/output signals of the differential pair 300 at step S203.

Figure 4:
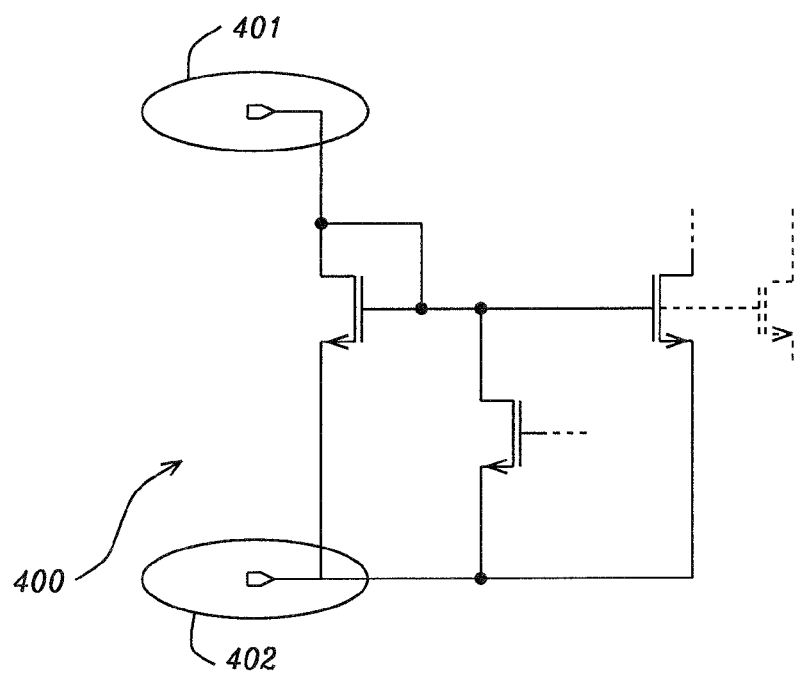

FIG. 4 schematically illustrates a current mirror 400 (with enable) as another example of a circuit element in the context of embodiments of the disclosure. The current mirror 400 comprises a number of interconnected transistors and has input/output signals 401, 402. Input signal 401 may be classified as a signal of category NOISYSENSE, whereas input signal 402 may be classified as SUPPLY. Thus, whenever a structure corresponding to the current mirror 400 is identified in an IC at steps S202, circuit paths connecting to the identified structure may be classified in accordance with the categories assigned to the input/output signals of the current mirror 400 at step S203.

Figure 5:
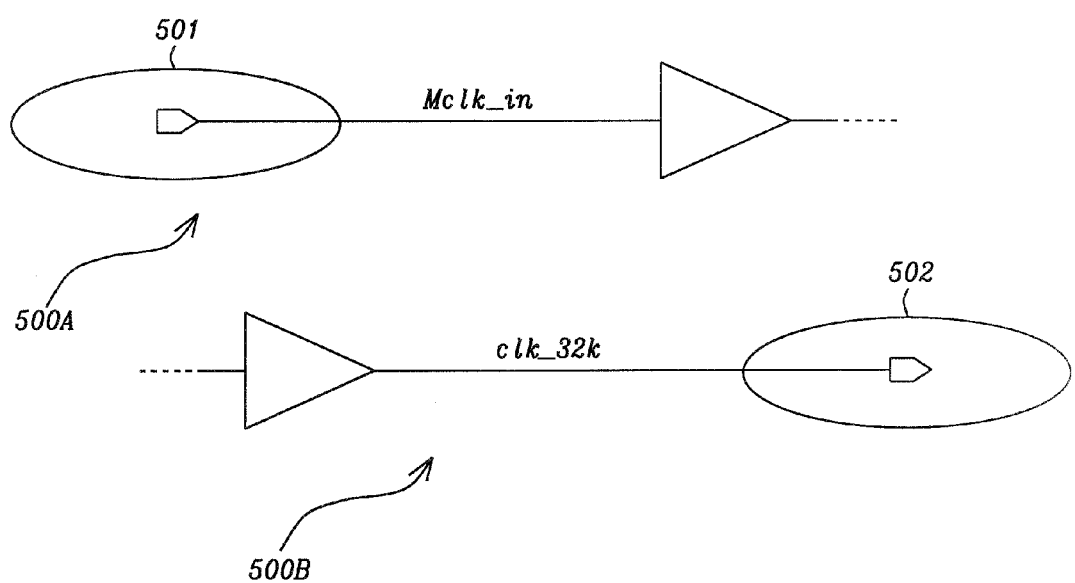

FIG. 5 schematically illustrates yet further examples of circuit elements 500A, 500B in the context of embodiments of the disclosure. These circuit elements 500A, 500B are defined by having an input signal 501 and output signal 502, respectively, that has a particular label, e.g. that is labelled as a clock signal ("clk"). Such signals having a particular label may be assigned to a unique corresponding category, e.g. signals labelled as clock signals may be classified into the category NOISY. Thus, by including circuit elements that are defined by labels of their input/output signals, circuit paths may be classified in accordance with their respective labels, i.e. by name matching at step S203.

It should be noted that the method features described above correspond to respective apparatus features that may however not be explicitly described, for reasons of conciseness. The disclosure of the present document is considered to extend also to such apparatus features.

It should further be noted that the description and drawings merely illustrate the principles of the proposed method. Those skilled in the art will be able to implement various arrangements that, although not explicitly described or shown herein, embody the principles of the disclosure and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the disclosure, as well as specific examples thereof, are intended to encompass equivalents thereof.

What is claimed is:

1. A method of routing signal lines of an integrated circuit, IC, performed by a computer, wherein the IC comprises a plurality of circuit topologies and a plurality of signal lines connecting the circuit topologies, the method comprising steps of:
   receiving a first representation of the IC, the first representation of the IC relating to a netlist or a schematic database;
   comparing, based on the first representation, the circuit topologies of the IC against a set of reference circuit topologies;
   classifying signals propagating along respective signal lines of the IC into a plurality of categories based on a result of the comparison; and
   routing the signal lines of the IC in accordance with the categories of their respective signals, thereby generating a second representation of the IC, the second representation of the IC relating to a layout for the IC that includes a relative arrangement of the signal lines,
   wherein the categories are representative of characteristics of the signals propagating along respective signal lines with regard to mutual interference between signals.

2. The method according to claim 1, wherein the step of comparing involves:
   identifying one or more circuit topologies of the IC that correspond to respective reference circuit topologies among the set of reference circuit topologies.

3. The method according to claim 2, wherein the step of classifying involves:
   classifying signals propagating along signal lines that connect to one or more of the identified circuit topologies in accordance with known properties of the respective identified circuit topologies.

4. The method according to claim 3, wherein the known properties of the reference circuit topologies include input/output characteristics of respective reference circuit topologies.

5. The method according to claim 1, wherein the set of reference circuit topologies is stored in a database.

6. The method according to claim 1, wherein the step of routing involves routing the signal lines of the IC in accordance with the categories of their respective signals and a set of routing constraints for respective categories.

7. The method according to claim 1, wherein any signals propagating along signal lines of the IC that are not classified in the step of classifying are classified into a default category.

8. The method according to claim 1, wherein the plurality of categories include a first category indicating that a signal propagating along a respective signal line is a signal that influences signals propagating along signal lines arranged within a coupling range of the respective signal line.

9. The method according to claim 1, wherein the plurality of categories include a second category indicating that a signal propagating along a respective signal line is a signal that is sensitive to external influence.

10. The method according to claim 1, wherein the plurality of categories include a third category indicating that a signal propagating along a respective signal line is a signal that influences signals propagating along signal lines arranged within a coupling range of the respective signal line and that is sensitive to external influence.

11. The method according to claim 1, wherein the plurality of categories include a fourth category indicating that a signal propagating along a respective signal line relates to a power supply for a respective circuit topology.

12. The method according to claim 1, further comprising a step of flagging signals within a given category as signals whose signal lines may be routed alongside each other based on a result of said comparison.

13. The method according to claim 1, wherein the IC comprises a plurality of interconnected functional blocks formed by respective circuit topologies of the IC.

14. A computer-readable storage medium comprising a computer program that makes a computer perform the steps of claim 1 when executed.

15. An apparatus for routing signal lines of an integrated circuit, IC, wherein the IC comprises a plurality of circuit topologies and a plurality of signal lines connecting the circuit topologies, the apparatus comprising:
   a reception block configured to receive a first representation of the IC, the first representation of the IC relating to a netlist or a schematic database;
   a comparison block configured to compare, based on the first representation, the circuit topologies of the IC against a set of reference circuit topologies;
   a classification block configured to classify signals propagating along respective signal lines of the IC into a plurality of categories based on a result of the comparison; and
   a routing block configured to route the signal lines of the IC in accordance with the categories of their respective signals, thereby generating a second representation of the IC, the second representation of the IC relating to a layout for the IC that includes a relative arrangement of the signal lines,
   wherein the categories are representative of characteristics of the signals propagating along respective signal lines with regard to mutual interference between signals.

16. The apparatus according to claim 15, wherein the comparison block is configured to identify one or more circuit topologies of the IC that correspond to respective reference circuit topologies among the set of reference circuit topologies.

17. The apparatus according to claim 16, wherein the classification block is configured to classify signals propagating along signal lines that connect to one or more of the identified circuit topologies in accordance with known properties of the respective identified circuit topologies.

18. The apparatus according to claim 17, wherein the known properties of the reference circuit topologies include input/output characteristics of respective reference circuit topologies.

19. The apparatus according to claim 15, wherein the set of reference circuit topologies is stored in a database.

20. The apparatus according to claim 15, wherein the routing block is configured to route the signal lines of the IC in accordance with the categories of their respective signals and a set of routing constraints for respective categories.

21. The apparatus according to claim 15, wherein the classification block is configured to classify any signals propagating along signal lines of the IC that are not classified based on a result of the comparison into a default category.

22. The apparatus according to claim 15, wherein the plurality of categories include a first category indicating that a signal propagating along a respective signal line is a signal that influences signals propagating along signal line arranged within a coupling range of the respective signal line.

23. The apparatus according to claim 15, wherein the plurality of categories include a second category indicating that a signal propagating along a respective signal line is a signal that is sensitive to external influence.

24. The apparatus according to claim 15, wherein the plurality of categories include a third category indicating that a signal propagating along a respective signal line is a signal that influences signals propagating along signal line arranged within a coupling range of the respective signal line and that is sensitive to external influence.

25. The apparatus according to claim 15, wherein the plurality of categories include a fourth category indicating that a signal propagating along a respective signal line relates to a power supply for a respective circuit topology.

26. The apparatus according to claim 15, wherein the classification block is configured to flag signals within a given category as signals whose signal lines that may be routed alongside each other based on a result of said comparison.

27. The apparatus according to claim 15, wherein the IC comprises a plurality of interconnected functional blocks formed by respective circuit topologies of the IC.

* * * * *